(12) United States Patent
Haapanen et al.

(10) Patent No.: US 10,447,592 B2
(45) Date of Patent: Oct. 15, 2019

(54) OUTPUT DEVICE DISCOVERY USING NETWORK SWITCHES

(71) Applicants: Tom Haapanen, Kitchener (CA); Jim Vopni, Kitchener (CA)

(72) Inventors: Tom Haapanen, Kitchener (CA); Jim Vopni, Kitchener (CA)

(73) Assignee: RICOH COMPANY, LTD., Tokyo (JP)

(*) Notice: Subject to any disclaimer, the term of this patent is extended or adjusted under 35 U.S.C. 154(b) by 63 days.

(21) Appl. No.: 15/892,378

(22) Filed: Feb. 8, 2018

(65) Prior Publication Data
US 2019/0245785 A1 Aug. 8, 2019

(51) Int. Cl.
| | |
|---|---|
| H04W 68/00 | (2009.01) |
| H04L 12/741 | (2013.01) |
| H04L 29/12 | (2006.01) |
| H04L 12/947 | (2013.01) |

(52) U.S. Cl.
CPC .............. *H04L 45/74* (2013.01); *H04L 49/25* (2013.01); *H04L 61/2007* (2013.01); *H04L 61/306* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 6,681,225 B1* | 1/2004 | Uceda-Sosa | ............ | G06F 9/526 |
| 6,834,298 B1* | 12/2004 | Singer | ................ | H04L 41/0253 |
| | | | | 709/220 |
| 9,026,145 B1* | 5/2015 | Duleba | ................... | H04L 61/25 |
| | | | | 455/456.3 |
| 2013/0067043 A1* | 3/2013 | Gaitonde | ............ | H04L 61/6059 |
| | | | | 709/220 |
| 2014/0325090 A1* | 10/2014 | Michelin | ............... | H04L 61/103 |
| | | | | 709/245 |
| 2016/0036777 A1* | 2/2016 | Bartlett | ................. | H04L 61/609 |
| | | | | 709/245 |
| 2016/0088020 A1* | 3/2016 | Chan | ........................ | G06F 16/22 |
| | | | | 726/1 |
| 2017/0264570 A1* | 9/2017 | Bugenhagen | ........... | H04L 45/66 |
| 2017/0337051 A1* | 11/2017 | Bertani | ................. | H04L 41/082 |
| 2019/0034487 A1* | 1/2019 | Balachandran | ... | G06F 16/24549 |

* cited by examiner

*Primary Examiner* — Sithu Ko
(74) *Attorney, Agent, or Firm* — Hickman Palermo Becker Bingham LLP; Malgorzata A. Kulczycka

(57) ABSTRACT

A network device managing system is provided for determining network addresses of network devices using network switches. The system comprises a server that determines network switches that communicate with the server, and receives network addresses of devices that are to be excluded from an address search. For each network switch: one or more first addresses of one or more devices that are configured on a switch are received from the switch. For each device, from the one or more devices configured on the switch, in response to determining that a first address of a device does not match any of the addresses of devices that are to be excluded from the address search, the server determines whether an association between the first address and a second address is stored in a server data repository, and if it is, the server transmits the second address to a global data repository.

20 Claims, 10 Drawing Sheets

OUTPUT DEVICE DISCOVERY USING NETWORK SWITCHES

TECHNICAL FIELD

The present approach relates to performing device discovery using network switches. SUGGESTED GROUP ART UNIT: 2447; SUGGESTED CLASSIFICATION: 358.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A fleet of output devices may be managed by system administrators by sending management instructions directly to the output devices. To be able to send instructions to output devices, the administrators need to know at least the Internet Protocol (IP) addresses of the devices. The IP addresses may be automatically discovered via address discovery, which involves computer hardware and/or computer software transmitting discovery queries to devices, and requesting that the devices respond to the queries and provide their own IP addresses. The automated address discovery process is more efficient than a manual address discovery process because it is not as labor-intensive or error-prone as the manual process. However, even performing automated address discovery is generally time consuming —especially if it is performed in a communications network that includes thousands of output devices. In such networks, performing address discovery may place great demands on the network bandwidth and may be quite inefficient, and may also require a large amount of time.

Performing automated address discovery may be quite challenging in computer networks that include, for example, combinations of IPv4 and IPv6 subnetworks. In IPv4 networks, a network address may be expressed as a.b.c.d, where a, b, c and d each indicates an octet, or eight bits, of a network address. A large corporate network may be divided into many smaller subnets, and the first three or two octets of the network address are used to identify the subnet, while the last octet is used to identify a specific device. The resulting maximum address space for IPv4 subnetworks may theoretically address 4,294,967,296 devices. Discovering that many devices may be quite difficult and time consuming.

Even if a network uses less than 4 billion of IPv4 addresses, discovering all output devices in a IPv4 network may still be time consuming. For example, if a network uses a private addressing space that implements 9.b.c.d addresses, where 9 is a first octet reserved for private networks, the resulting maximum address space is 16,777,216. Performing address discovery on 16 million of network addresses may be still quite time-consuming. In fact, performing the discovery on 16 million addresses may be unnecessary if the network uses only a small part of that address space.

From a discovery point of view, performing address discovery in IPv6 networks is even more time-consuming and inefficient than in IPv4 networks. That is because the address space in IPv6 networks is larger than in IPv4 networks. In IPv6 networks, the IP addresses are represented using 128 bits (16 octets), rather than 32 bits as it is in IPv4 networks. A complete IPv6 address might look like 2001: 0db8: 0000: 0000: 0000.1f00: 0042: 8329. This can be abbreviated to 2001:db8:ff00: 42: 8329, but the resulting maximum address space is still enormous.

Even if a network uses a private IPv6 address space, the address space is still huge. For example, for private networks, fc00::/7 has been reserved, and if it is combined with a 40-bit prefix, it may provide private address spaces such as fde4: 8dba:82e1::/48 for an internal network, with 80 bits (10 octets) of addressing capability. That results in an enormous address space, and performing address discovery in that space would be extremely time-consuming. In fact, it may even stall data traffic in the network.

In networks that include both IPv4 and IPv6 subnets, performing address discovery may be just impractical. In IPv4 subnets, the discovery applications or systems may scan entire subnets (up to 254 devices for a single-octet subnet). However, with IPv6 subnets that typically have 64 bit-long addresses (eight octets), and thus $1.8 \times 9^{18}$ addresses, scanning the entire subnet may be impractical as it could take years to complete the scanning. Subsequently, discovering the IP addresses of devices in large and heterogenic computer networks using address discovery may be inefficient and impractical.

SUMMARY

In an embodiment, an improved method for determining network addresses of output devices configured in a communications network is disclosed. The improved method may include determining network addresses of one or more output devices configured in the network. The improved method may be performed by one or more network device management servers that communicate with one or more network switches. Each switch may be configured to receive, process, and forward data packets to and from one or more output devices. The output devices may include multifunction peripheral devices, scanners, fax machines, copiers, printers, and similar devices.

In an embodiment, a network device management server is configured to determine network addresses of output devices that are configured on one or more switches. To do so, the server may query the switches and certain data repositories, and use the received information to determine the network addresses of the output devices configured on the switches.

However, if a network address of an output device cannot be determined by querying the switches and the repositories, then the network device management server may execute address discovery to request that the device itself provide its own network address.

Using this approach, a network device management server determines most of the network addresses of output devices without using address discovery, and invokes address discovery only on rare occasions. Regardless of whether the approach is used to determine the network addresses for a small, medium, or large computer network, the server generally determines the addresses in the network faster than if the addresses were discovered solely using address discovery.

Because performing address discovery is time consuming and taxing on network bandwidth, a network device management server tries to determine as many network addresses as possible by querying the network switches and repositories, and reverts to address discovery if network addresses of some output devices cannot be determined by the querying.

In an embodiment, network addresses that a network device management server is trying to determine are Internet Protocol (IP) addresses of output devices. To determine the IP addresses, the network device management server queries one or more switches to provide media access control (MAC) addresses of the devices that are configured on the switches. The switches respond with messages that include the requested information. Once the server identifies one or more MAC addresses in the received information, the server may test whether a MAC address, from the received MAC addresses, is to be excluded from the search. A MAC address may be excluded from the search if for example, the MAC address corresponds to a device that is not an output device, or if an IP address assigned to the device having the MAC address has been already determined.

In response to determining that a MAC address provided by a switch to a network device management server is not to be excluded, the network device management server attempts to determine an IP address of an output device based on the MAC address and data stored in data repositories that are accessible to the server. If the server's data repository includes an IP address associated with that MAC address, then the server extracts the IP address from the server's data repository, and transmits the extracted IP address to a global data repository for storing and for using by a central manager to manage the output device. At this point, the server determined the IP address of the output device without executing an address discovery. Because the server determined the IP address of the output device without employing address discovery, the network device management server did not place significant demands on the network bandwidth.

However, if such a MAC address is not included in the server's data repository or if the server's data repository does not include an IP address associated with the MAC address, then the network device management server invokes address discovery to determine the IP address of an output device that is associated with the MAC address. Since performing address discovery may be time consuming and may place demands on the network bandwidth, the server reverts to using address discovery if the server is unable to determine the IP address otherwise.

DETAILED DESCRIPTION

Figure 1A:
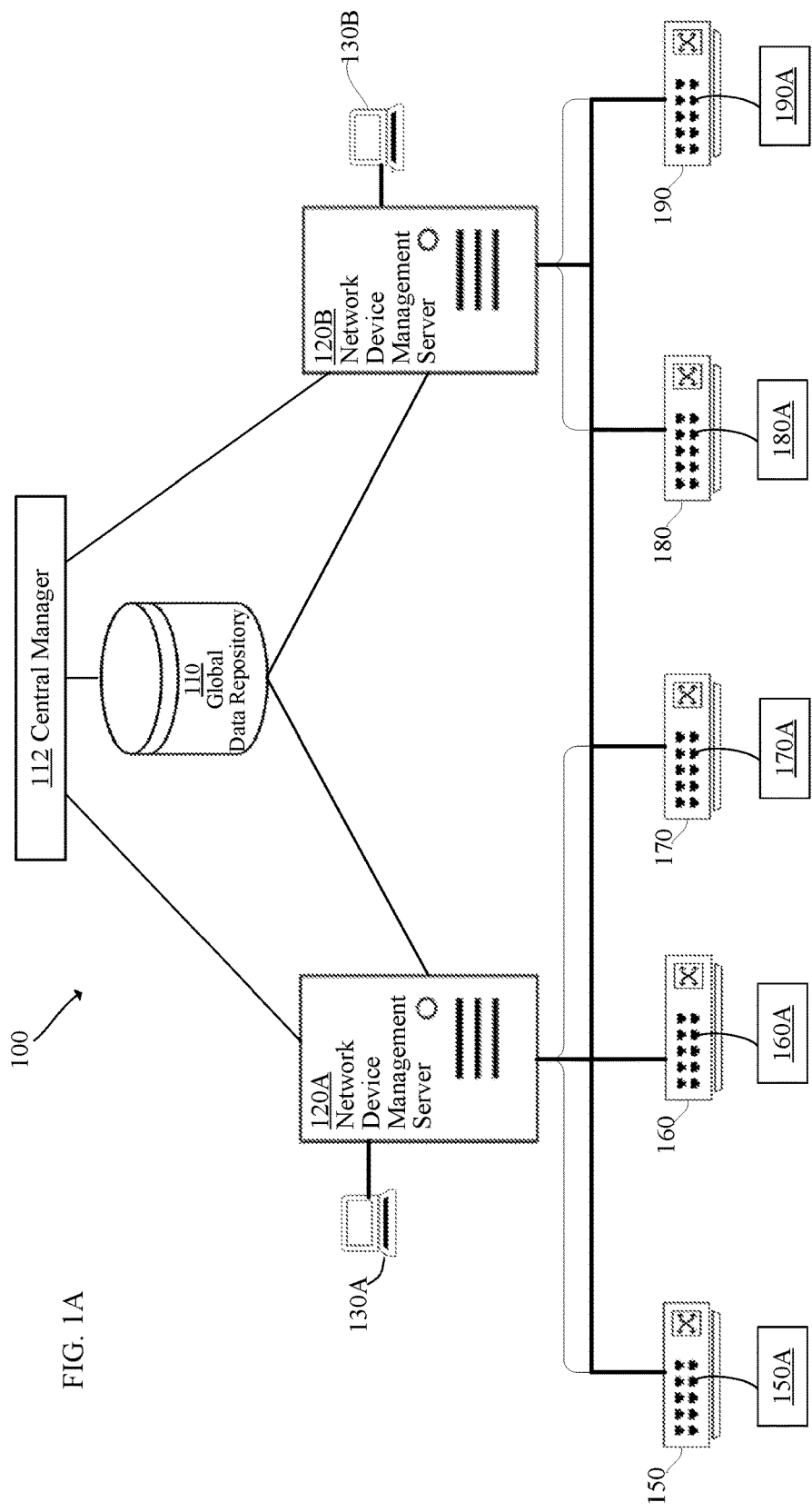
FIG. 1A is a block diagram that depicts an example architecture for performing output device discovery using network switches.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

I. OVERVIEW
    II. EXAMPLE ARCHITECTURE OF A NETWORK DEVICE MANAGEMENT SYSTEM
    III. EXAMPLE ARCHITECTURE OF A NETWORK DEVICE SERVER
    IV. EXAMPLE NETWORK DEVICE MANAGEMENT SERVER
    V. GLOBAL DATA REPOSITORY
    VI. EXAMPLE INFORMATION STORED BY NETWORK SWITCHES
    VII. EXAMPLE SERVER DATA REPOSITORY
    VIII. OUTPUT DEVICE DISCOVERY USING NETWORK SWITCHES
    IX. EXAMPLE FLOW CHART FOR PERFORMING OUTPUT DEVICE DISCOVERY USING NETWORK SWITCHES
    X. EXAMPLE FLOW CHART FOR PERFORMING ADDRESS DISCOVERY
    XI. EXAMPLES OF MAC ADDRESSES
    XII. ORGANIZATIONALLY UNIQUE IDENTIFIERS
    XIII. MANAGEMENT INFORMATION BASE
    XIV. IMPROVEMENTS PROVIDED BY CERTAIN EMBODIMENTS
    XV. IMPLEMENTATION MECHANISMS

I. Overview

An approach is provided for an improved method for determining network addresses of devices configured in a communications network. The improved method includes determining network addresses of one or more output devices configured in a communications network. The improved method may be performed by one or more network device management servers that communicate with one or more network switches. A switch may be configured to communicate data packets to and from one or more output devices such as multifunction peripheral devices, scanners, fax machines, printers, and similar devices.

In an embodiment, a network device management server is configured to determine network addresses of output devices by querying one or more switches and certain data repositories, and using the received information to determine the network addresses of the output devices. However, if a network address of an output device cannot be determined by querying the switches and the repositories, then the server executes address discovery to request that the device provide its own network address.

Due to the fact that performing address discovery is usually time-consuming and taxing on the network bandwidth, a network device management server performs address discovery when the server is unable to determine a network address of an output device just by querying network switches and data repositories. The server invokes address discovery only on rare occasions because the server is most likely able to determine most of the network addresses without using address discovery.

The approach may be used to determine network addresses of output devices in any type of computer networks because a network device management server determines the addresses in the networks faster than if the addresses had to be discovered solely using address discovery.

In an embodiment, an approach presented herein pertains to determining IP addresses of output devices. To determine the IP addresses, a network device management server queries network switches and local data repositories, and uses the received data to determine as many IP addresses as possible without performing address discovery.

However, if an IP address of an output device cannot be determined by querying the network switches and local data repositories, then the network device management server reverts to address discovery, and queries the device to provide the device's IP address.

Because performing address discovery is time consuming and taxing on the network bandwidth, a network device management server tries to determine the IP addresses of output devices by querying the network switches and repositories first, and reverts to address discovery if the querying does not result in determining some IP addresses.

To query one or more switches, a network device management server may transmit requests to the switches to provide MAC addresses of the devices that are configured on the switches. The switches may respond with messages that include the requested information.

Information received from a switch may include for example, an alphanumerical string, or a list, that includes one or more MAC addresses of the devices that are configured on the switch. In addition to the MAC addresses, the information may include supplementary information, such as names of the devices, settings implemented on the devices, and so forth.

Upon receiving the information from a switch, a network device management server may parse the received information to identify one or more MAC addresses of the devices configured on the switch.

Once a network device management server identifies one or more MAC addresses in the received information, the server may retrieve exclusion information, and select, from the one or more MAC addresses, those MAC addresses that are not to be excluded.

Exclusion information may be provided in a form of an exclusion list, a form of an exclusion collection, or in other form. An exclusion list, or a collection, may be any type of data structure that is suitable for storing MAC addresses of devices for which a network device management server is not expected to determine IP addresses. The list/collection may also be represented as a list, a table, a pointer-based data structure, a database item collection, and so forth.

Exclusion information may include MAC addresses of devices that are not output devices, and thus a network device management server is not expected to determine IP addresses of those devices. The exclusions may also include MAC addresses of the devices for which the IP addresses are already known and have been validated. Therefore, the server is not expected to determine IP addresses of those devices. Furthermore, the exclusions may include MAC addresses of the devices that are not going to be managed, and thus the server is not expected to determine IP addresses of those devices.

There are many ways for a network device management server to determine the MAC addresses that are included in the information received from the switch but for which the server is not expected to determine IP addresses. For example, the server may compare each of the MAC addresses included in the received information with each MAC address included in the exclusions. If a particular MAC address included in the received information does not match any of the MAC addresses included in the exclusions, then the server determines that the server is expected to determine an IP address of the device having that MAC address.

In response to determining that a MAC address provided by a switch to a network device management server is not included on the exclusions, the server attempts to determine an IP address of the device based on the MAC address and data stored in one or more data repositories that are accessible to the server.

One or more data repositories that are accessible to a network device management server may include data repositories maintained by the server itself. A data repository that is maintained by the server itself is referred to herein as a server data repository.

A server data repository may include, among other things, mappings from MAC addresses onto IP addresses of network devices. The server data repository may also include additional information about the devices, such as names of the devices. The server data repository may be generated and updated by for example, system administrators when the network and/or network switches are configured or reconfigured.

Another type of data repositories is a global data repository. A global data repository is separate from a server data repository, and has a different purpose than the server data repository. A global data repository is used to store IP addresses of output devices, and the IP addresses stored in the global data repository are used by a central manager to manage the output devices. A network device management server determines the IP addresses of the output devices, and stores the determined IP addresses in the global data repository. In contrast, a server data repository is used by the network device management server to determine whether the server data repository stores IP addresses for devices for which MAC addresses have been provided to the server by a switch. The server data repository is used by the server to determine the IP addresses of the output devices, while the global data repository is used by the central manager to manage the output devices.

In an embodiment, a network device management server determines whether a server data repository includes a MAC address that matches the MAC address that the server received from a switch but that was not included in the exclusions. If such a match is found, then the server checks whether the server data repository includes an IP address associated with that MAC address. If the server data repository includes an IP address associated with that MAC address, then the server retrieves the IP address from the server data repository, and transmits the IP address to a global data repository for storing. At this point, the server determined the IP address of an output device for which a switch provided the MAC address. The network device management server accomplished that without executing address discovery. Hence, the IP address was determined without placing demands on the network bandwidth.

However, if such a MAC address is not included in the server data repository or if the server data repository does not include an IP address associated with the MAC address, then a network device management server may execute address discovery to determine the IP address of an output device that is associated with the MAC address. Executing address discovery may be viewed as a "backup" plan for the server to determine the IP address of the output device. Since executing address discovery may be time-consuming and may place demands on the network bandwidth, the server reverts to address discovery if the server is unable to determine the IP address otherwise.

If a network device management server is unable to determine, based on contents of the server data repositories, an IP address of an output device that is associated with the MAC address received by the server from the switch, then the server initiates address discovery. This may include sending a MAC-based, address-discovery query to the network to request that a device that is associated with the MAC address included in the query provide the device's information, including the device's IP address.

The likelihood that a network device management server initiates address discovery to obtain an IP address of an output device is rather low. Most likely, the server can determine IP addresses for most of the devices for which the server received MAC addresses from the switch. However, if the server is unable to determine a corresponding IP address, then the server uses the MAC address to perform an address-specific discovery of the device.

In response to sending a MAC-based, address-discovery query, a network device management server may receive a response. The response may include the device's IP address. Optionally, the response may also include the device's configuration data.

In response to receiving a response from the device, a network device management server may parse the response to identify the device's IP address, and optionally configuration data. Based on the device's configuration data, the network device management server may determine whether the device is an output device. If the server determines that the device is an output device, then the server may store the IP address provided by the device in a server data repository. The IP address may be stored in the server data repository in a form of an association between the IP address and the corresponding MAC address of the output device. The server may transmit the IP address to a global data repository along with a request to store the IP address as an IP address of the output device that a central manager may manage.

However, if no response is received to a MAC-based, address-discovery query, then a network device management server determines that a device that is associated with the MAC address is non-responsive, or may be decommissioned from the network. Therefore, the server may include the MAC address in the exclusions, and proceed to determining an IP address for a next MAC address provided by a switch.

II. Example Architecture of a Network Device Management System

FIG. 1A is a block diagram that depicts an example architecture 100 for performing output device discovery using network switches. The example architecture 100 includes a central manager 112 that is configured to manage output devices implemented in the architecture 100. Central manager 112 may be configured to communicate with one or more network device management servers 120A, 120B, and one or more global data repositories 110. An example of global data repository 110 is described in detail in FIG. 3A.

Network device management servers 120A, 120B are configured to manage subnetworks of the architecture 100, and may be implemented in any type of computing devices, such as workstations, mainframes, cloud-based servers, and the like. An example of network device management server 120A is described in FIG. 2A.

Network device management servers 120A, 120B are configured to communicate with network switches, global data repository 110, and central manager 112. For example, network device management server 120A may be configured to communicate with one or more network switches 150, 160, 170, while network device management server 120B may be configured to communicate with one or more network switches 180, 190. Although FIG. 1A depicts two network device management servers 120A, 120B, the architecture 100 may include just one network device management switch, or more than two network device management servers.

Network device management servers 120A, 120B may be configured with corresponding operator consoles. For example, server 120A may be configured with an operator console 130A, while server 120B may be configured with an operator console 130B. The operator consoles may include input devices such as keyboards, and display devices such as computer monitors. The operator consoles may also be implemented in portable devices such as smartphones, tablets, PDAs, and the like.

Network switches 150, 160, 170, 180, 190 are computer networking device that connect other devices in the network and are configured to receive, process, and forward data from source devices to destination devices. Although FIG. 1A depicts 5 switches, the architecture 100 may include any number of switches, and the switches may be connected in many different ways, not all of which are depicted in FIG. 1A.

In the example depicted in FIG. 1A, network switches 150, 160, 170, 180, 190 are configured with corresponding output devices. Examples of output devices include multifunction peripherals, scanners, copiers, printers, and the like. According to FIG. 1A, network switch 150 is configured with one or more devices 150A; network switch 160 is configured with one or more devices 160A; network switch 170 is configured with one or more devices 170A; network switch 180 is configured with one or more devices 180A; and network switch 190 is configured with one or more devices 190A.

In the architecture 100, network device management server 120A may be configured to determine network addresses of output devices 150A by querying switch 150, determine network addresses of output devices 160A by querying switch 160, and determine network addresses of output devices 170A by querying switch 170. Furthermore, network device management server 120B may be configured to determine network addresses of output devices 180A by querying switch 180, and determine network addresses of output devices 190A by querying switch 190.

III. Example Architecture of a Network Device Server

Figure 1B:
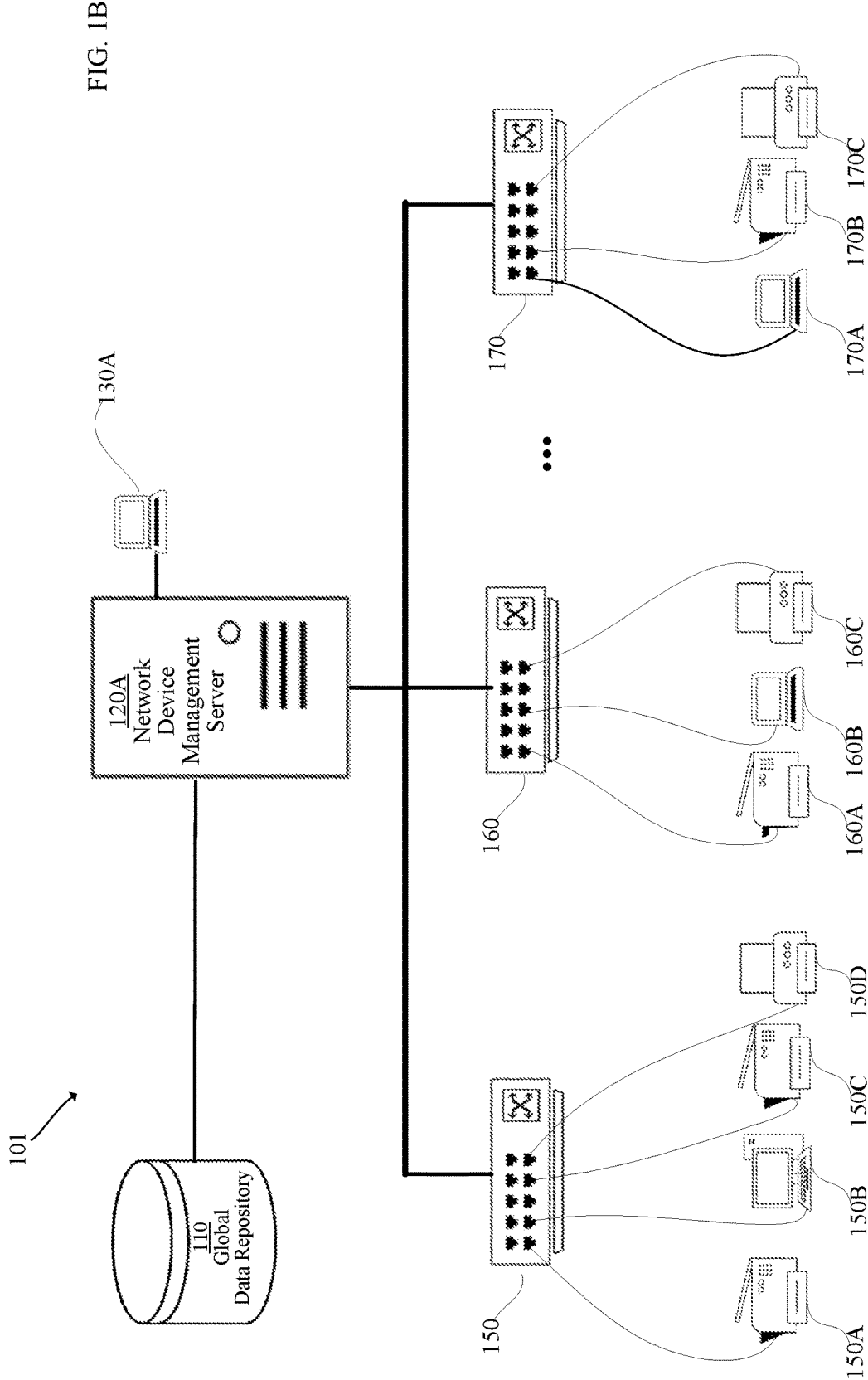
FIG. 1B is a block diagram that depicts an example architecture for a network device management server to perform output device discovery using network switches.

FIG. 1B is a block diagram that depicts an example architecture 101 for a network device management server to perform output device discovery using network switches. The example depicted in FIG. 1B describes network device management server 120A that is configured with an operator console 130A, and communicates with network switches 150, 160, 170 and global data repository 110. An example of global data repository 110 is described in FIG. 3A. Network device management server 120A is described in detail in FIG. 2.

In the example depicted in FIG. 1B, network device management server 120A communicates with three switches 150, 160, 170; however, in other examples, network device management server 120A may communicate with any count of switches.

Switches 150, 160, 170 facilitate communications to and from output devices. A switch is a controller that enables networked devices to talk to each other efficiently. The switches may be connected to any number of devices, and the devices may include printers, multifunction peripheral devices, scanners, copiers, workstations, personal computers, tablets, and so forth.

Merely to provide clear examples, the devices depicted in FIG. 1B include output devices; however, the devices configured on the switches may be any type of devices. In the example depicted in FIG. 1B, output devices 150A, 150B, 150C, 150D are configured on switch 150; output devices 160A, 160B, 160C are configured on switch 160; and output devices 170A, 170B are configured on switch 170.

Output devices 150A, 150C, 160A, 170B are multifunction peripheral devices; output device 150B is a server; output devices 150D, 160C and 170C are printers; and output devices 160B, 170A are personal computers. In other examples, the devices and the correspondence between the switches and the output devices may be different than that depicted in FIG. 1B.

In the depicted example, network device management server 120A is configured to determine network addresses of output devices 150A-D, 160A-C, and 170A-C that are configured on switches 150, 160, 170, respectively. Network device management server 120A may query the switches and certain data repositories, and use the received information to determine the network addresses of output devices 150A-D, 160A-C, and 170A-C.

IV. Example Network Device Management Server

Figure 2:
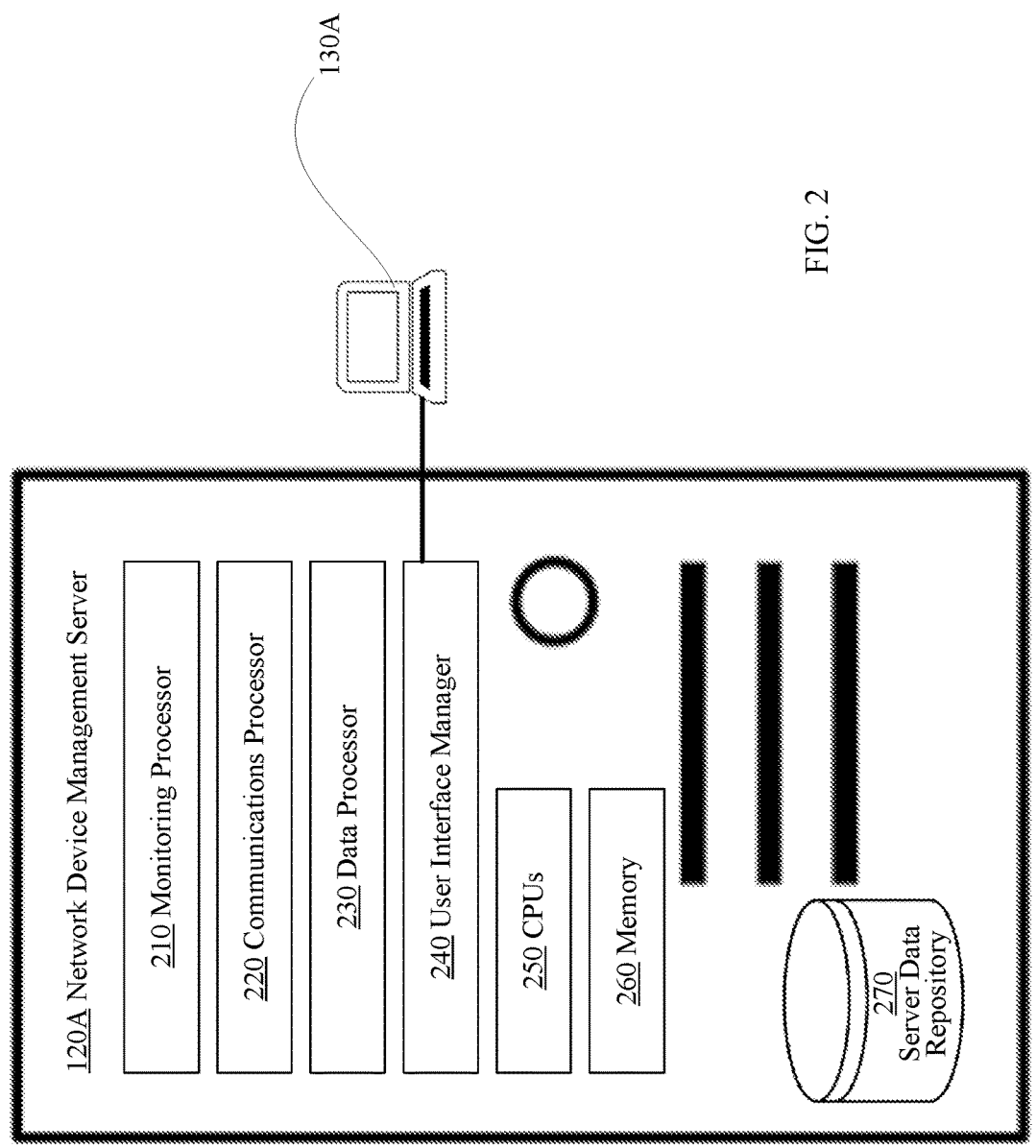
FIG. 2 is a block diagram that depicts an example architecture of a network device management server.

FIG. 2 is a block diagram that depicts an example architecture of a network device management server 120A. Network device management server 120A depicted in FIG. 2 is one of many examples of servers that may be configured to implement an improved method for determining network addresses of output devices.

Network device management server 120A is a computer designed to process requests and deliver data to other computers and devices via communications links and/or computer networks. Network device management server 120A may be configured to provide various software resources and may be implemented in software.

Although configurations of network device management servers may vary, in an embodiment, network device management server 120A depicted in FIG. 2 comprises one or more monitoring processors 210, one or more communications processors 220, one or more data processors 230, one or more user interface managers 240, one or more central processing units (CPUs), one or more memory units 260, and one or more server data repositories 270.

Processors 210, 220, 230 and user interface managers 240 may be implemented in hardware and/or software, and may be configured to execute programmable instructions to perform specific tasks. For example, monitoring processor 210 may be configured to monitor data traffic and communications directed to and from switches, such as switches 150, 160, 170 depicted in FIG. 1B.

Communications processors 220 may be configured to generate queries and transmit the queries to switches to cause the switches to respond with information about output devices configured on the switches. Communications processors 220 may also be configured to receive responses from the switches and transmit the responses to data processors 230. Furthermore, communications processors 220 may be configured to invoke an address discovery process, and initiate address discovery process to determine an IP address of an output devices when network device management server 120A is unable to determine the IP address without the discovery.

Data processors 230 may be configured to receive responses from switches, parse the responses, and determine whether based on the contents of the responses and contents of server data repository 270, data processors 230 may determine network addresses of output devices configured on the switches. Data processors 230 may also retrieve exclusions, interest lists, and other lists, that data processors 230 may use to narrow down the scope of the search of the network addresses.

User interface manager 240 may be configured to generate a user interface, and display the user interface on an operator console 130A. The user interface may be any type of interface, including a graphical user interface (GUI). The user interface may be displayed on operator console 130A, and may be configured to allow a user to provide input to user interface manager 240. Based on the received input, user interface manager 240 may update the user interface.

One or more CPUs 250 may be hardware-based components that are responsible for interpreting and executing commands and instructions of network device management server 120A.

One or more memory units 260 may be any type of physical devices capable of storing information temporarily or permanently. Memory 260 may be implemented for example, as random-access memory (RAM), read-only memory (ROM), and the like, and may be used to store information on integrated circuits used by the operating system, software, and hardware.

Server data repository 270 may be implemented in any type of storage device configured to store data permanently. Server data repository 270 may be used to store for example, mappings from MAC addresses onto IP addresses of network devices. Server data repository 270 may also store additional information about the output devices, such as names of the devices. An example of server data repository 270 is described in FIG. 4.

V. Global Data Repository

Figure 3B:
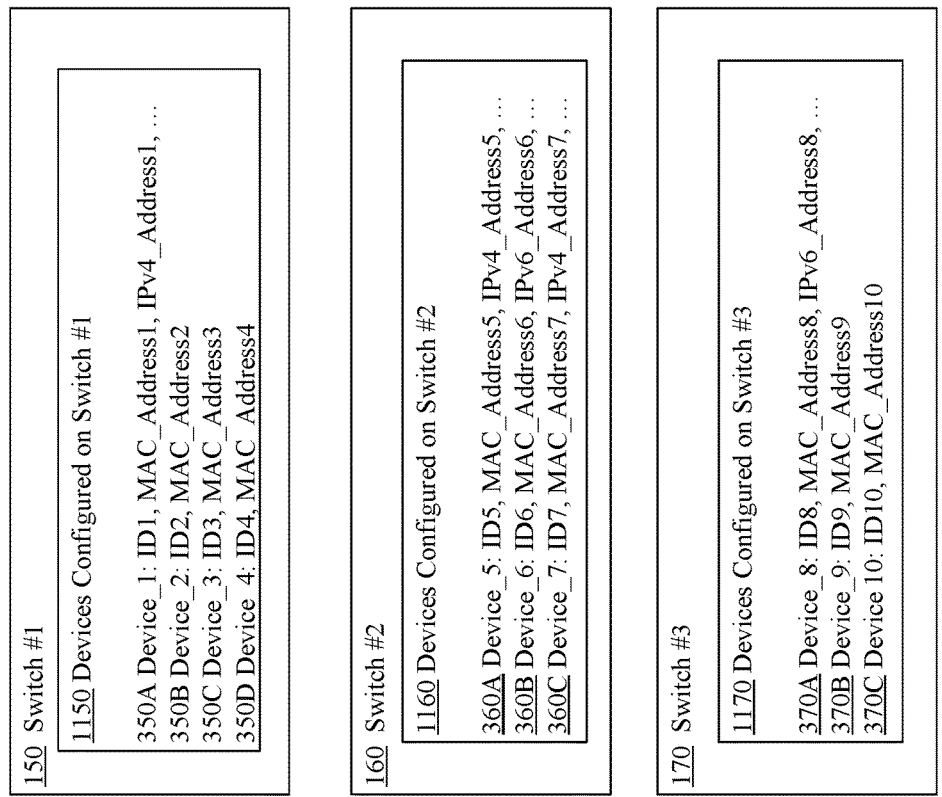
FIG. 3B depicts example information stored by switches for devices that are configured on the switches.
Figure 3A:
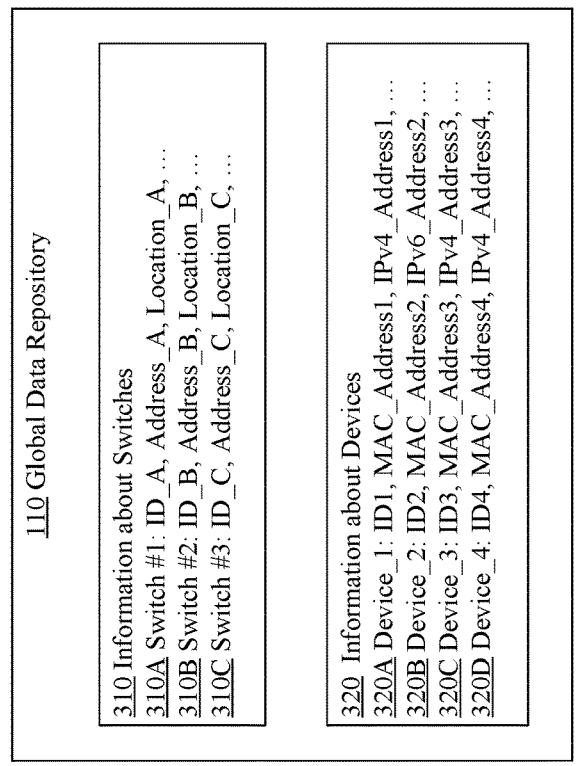
FIG. 3A depicts an example global data repository.

FIG. 3A depicts an example global data repository 110. Global data repository 110 may be implemented in any type of storage device configured to store data permanently.

In an embodiment, global data repository 110 is separate from server data repository 270, and has a different purpose than server data repository 270. Global data repository 110 is used to store information about network devices that are managed by a central manager, such as central manager 112 (shown in FIG. 1A). The information stored in global data repository 110 may include network addresses and other information about the managed devices. The network addresses of the managed devices may include IP addresses of the devices. The network addresses stored in global data repository 110 are used by the central manager to manage the managed devices. The central manager may use the network addresses stored in global data repository 110 to for example, transmit management instructions to the managed devices. The network addresses stored in global data repository 110 are provided to global data repository 110 by network device management servers that determine the network addresses of the output devices, and store the determined network addresses in global data repository 110.

In an embodiment, global data repository 110 stores information 320 about one or more managed devices. The managed devices may include output devices, such as multifunction peripheral devices, printers, copies, fax machines, and scanners. Information 320 may be stored in any type of data structures configured to store data. For example, information 320 may be stored in multidimensional arrays or tables that may be indexed using device identifiers, addresses, or names.

In the example depicted in FIG. 3A, information 320 includes a data record 320A about a device 1, a data record 320B about a device 2, a data record 320C about a device 3, and a data record 320D about a device 4. Information 320 may also include additional information not depicted in FIG. 3A.

Contents of data records 320A-320D are specific to the respective devices and may include the device's identifier, the device's MAC address, the device IPv4 address (or the device's IPv6, address), and any other type of information that is available about the devices. For some devices, information 320 may include additional elements not listed above; for other devices, information 320 may include fewer elements than listed above.

Global data repository 110 may also store information 310 about switches that are implemented in a network. Information 310 may be included in global data repository 110 if for example, a central manager is configured to manage the switches, or if the information about the switches has been configured in global data repository 110 by a system administrator.

Information 310 about switches may include one or more data records, and each data record may correspond to an entry used to store information about a switch. In the example depicted in FIG. 3A, information 310 includes a data record 310A about a switch 1, a data record 310B about a switch 2, and a data record 310C about a switch 3. The data records may store information about names, identifiers, network addresses, and locations of the switches. Some data records may include additional information, while other data records may include less information.

VI. Example Information Stored by Network Switches

FIG. 3B depicts example information stored by switches for devices that are configured on the switches. The examples described in FIG. 3B are provided to illustrate simple examples, and not to limit the type of information that the switches may store.

The examples depicted in FIG. 3B show information 1150 about devices configured on switch 150, information 1160 about devices configured on switch 160, and information 1170 about devices configured on switch 170. Information 1150 may also include data about other switches.

Contents of information 1150, 1160, 1170 may vary and does not have to include the same type of information for the corresponding switches. For example, information 1150 and information 1170 may include IP addresses for some devices, but not for all devices configured on switches 150, 170, respectively. Information 1150 includes names, identifiers, MAC addresses for devices 1-4, and an IP address of device 1. Information 1160 includes names, identifiers, MAC addresses and IP addresses of devices 5-7 that are configured on switch 160. Information 1170 includes names, identifiers, MAC addresses for devices 8-9, and an IP address for device 8.

Switches 150, 160, 170 may be queried by network device management servers to provide information about devices that are configured on switches 150, 160, 170, respectively. For example, network device management server 120A may query switch 150 to provide information 1150. Once network device management server 120A receives information 1150, server 120A may parse information 1150 to identify MAC addresses of devices 1-4, respectively, and use the MAC addresses to find out whether the corresponding IP addresses are to be determined.

VII. Example Server Data Repository

Figure 4:
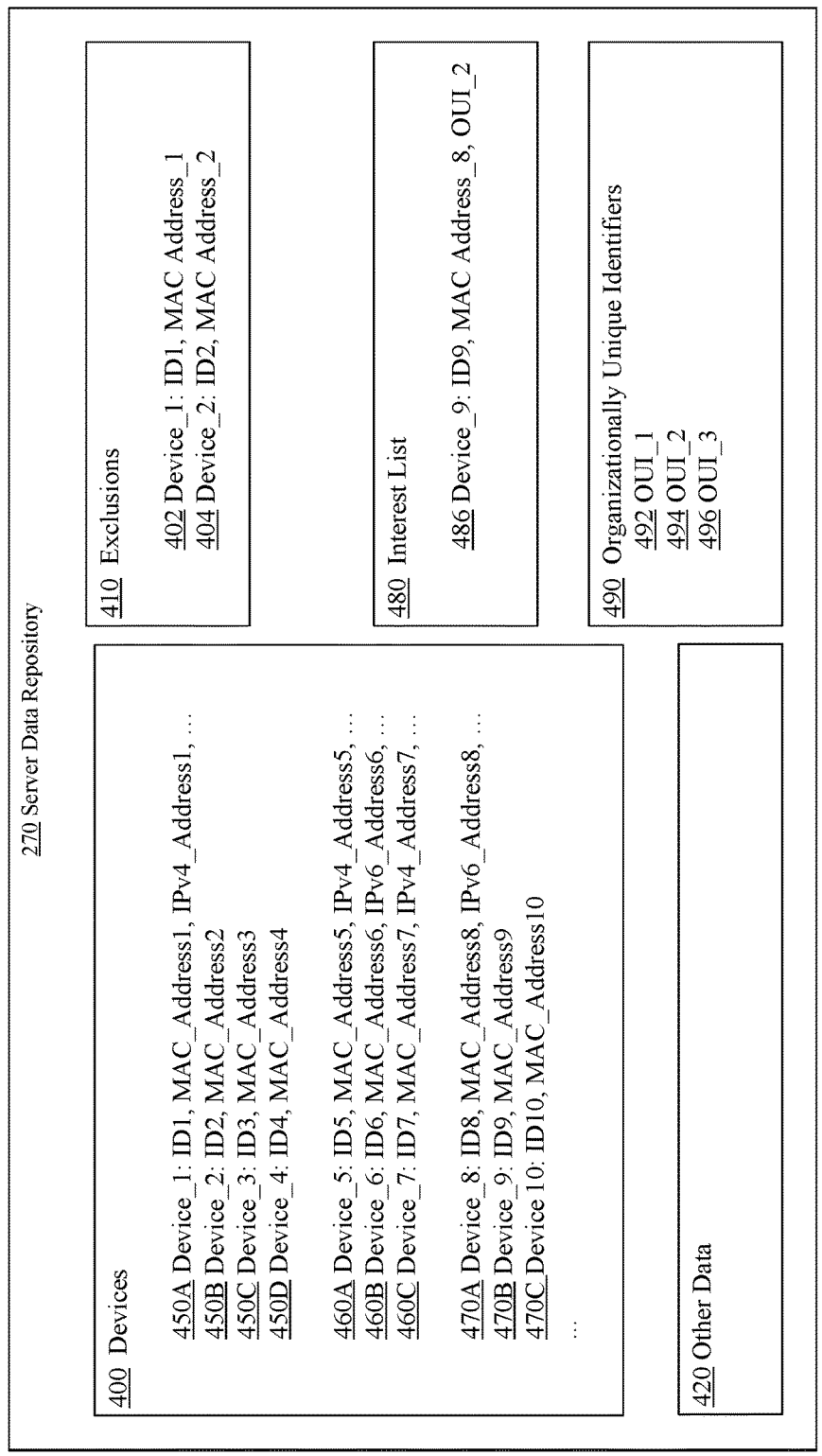
FIG. 4 depicts an example server data repository.

FIG. 4 depicts an example server data repository 270. Server data repository 270 may be implemented in any type of storage device configured to store data permanently. Repository 270 is used to store information about devices. The stored information may include for example, names, identifiers and one or more network addresses of the devices.

For some devices, server data repository 270 may include for example, only names and MAC addresses. For some other devices, server data repository 270 may include names, MAC addresses and IP addresses, in which case server data repository 270 includes a mapping from the MAC address onto the IP address of the device. If a mapping from a MAC address onto an IP address is stored in server data repository 270 for a device, then, in some situations, a network device manager server may extract the IP address from the mapping, and transmit the IP address to a global data repository.

As a network device management server determines network addresses for output devices, the network device management server stores the determined network addresses in server data repository 270. Some of the addresses, such as MAC addresses of the devices, may be provided to the network device management server by network switches. Some other addresses may be provided to the network device management server by a system administrator when the server is configured. Some other addresses may be determined by the network device management server itself.

The examples described in FIG. 4 are provided to illustrate simple examples, and not to limit the type of information that may be stored in server data repository 270.

The examples depicted in FIG. 4 show information 400 about devices, information 410 about devices for which a network device management server is not expected to determine network addresses, an interest list 480 that the server examines as the server determines the network addresses of the output devices, organizational unique identifiers 490, and optionally other data 420.

Contents of information 400 may vary and do not have to include the same types of information for each and every device included in information 400. In the example depicted in FIG. 4, information 450A, 460A, 460B, 460C, and 470A includes names, identifiers, MAC addresses and IP addresses of devices 1, and 5-8, respectively; while information 450B, 450C, 450D, 470B and 470C includes names, identifiers and MAC addresses of devices 2-4 and 9-10, respectively.

Contents of exclusions 410 include identifications of devices for which a network device management server is not expected to determine network addresses. The devices that may be excluded from the determination may include the devices that are not managed centrally, and thus their IP addresses need not to be stored in a global data repository. The excluded devices may also include the devices that are autonomous servers and mainframes. Furthermore, the excluded devices may include the devices for which IP addresses has been already determined, validated and stored in the global data repository.

Contents of exclusions 410 may vary and do not have to include the same types of information for each and every device included in exclusions 410. In the example depicted in FIG. 4, exclusions 410 include a record 402 and a record 404. Record 402 includes a name, an identifier and a MAC address of a device _1, while record 404 includes a name, an identifier and a MAC address of a device _2. Exclusions 410 may include additional record, or may include fewer records than those depicted in FIG. 4.

Organizationally unique identifiers (OUIs) 490 are 24-bit long numbers that may be extracted from MAC addresses, and that uniquely identify vendors, manufacturers or organizations that provided or own the devices having the MAC addresses. OUIs stored in OUIs 490 are used to determine whether the devices for which the MAC addresses are provided by the switches or devices themselves, were provided by the vendors, manufacturers, or organizations whose identifiers are stored in OUIs 490. For example, upon receiving a MAC address from a device, a server extracts an OUI from the MAC address and compares the extracted OUI with OUIs 490 to determine whether the device was provided by a particular vendor or manufacturer. In the example depicted in FIG. 4, OUI 490 comprise a data record 492 that includes an OUI_1, a data record 494 that includes an OUI_2, and a data record 496 that includes an OUI_3. The OUIs are described in detail in 8C.

VIII. Output Device Discovery Using Network Switches

Figure 5:
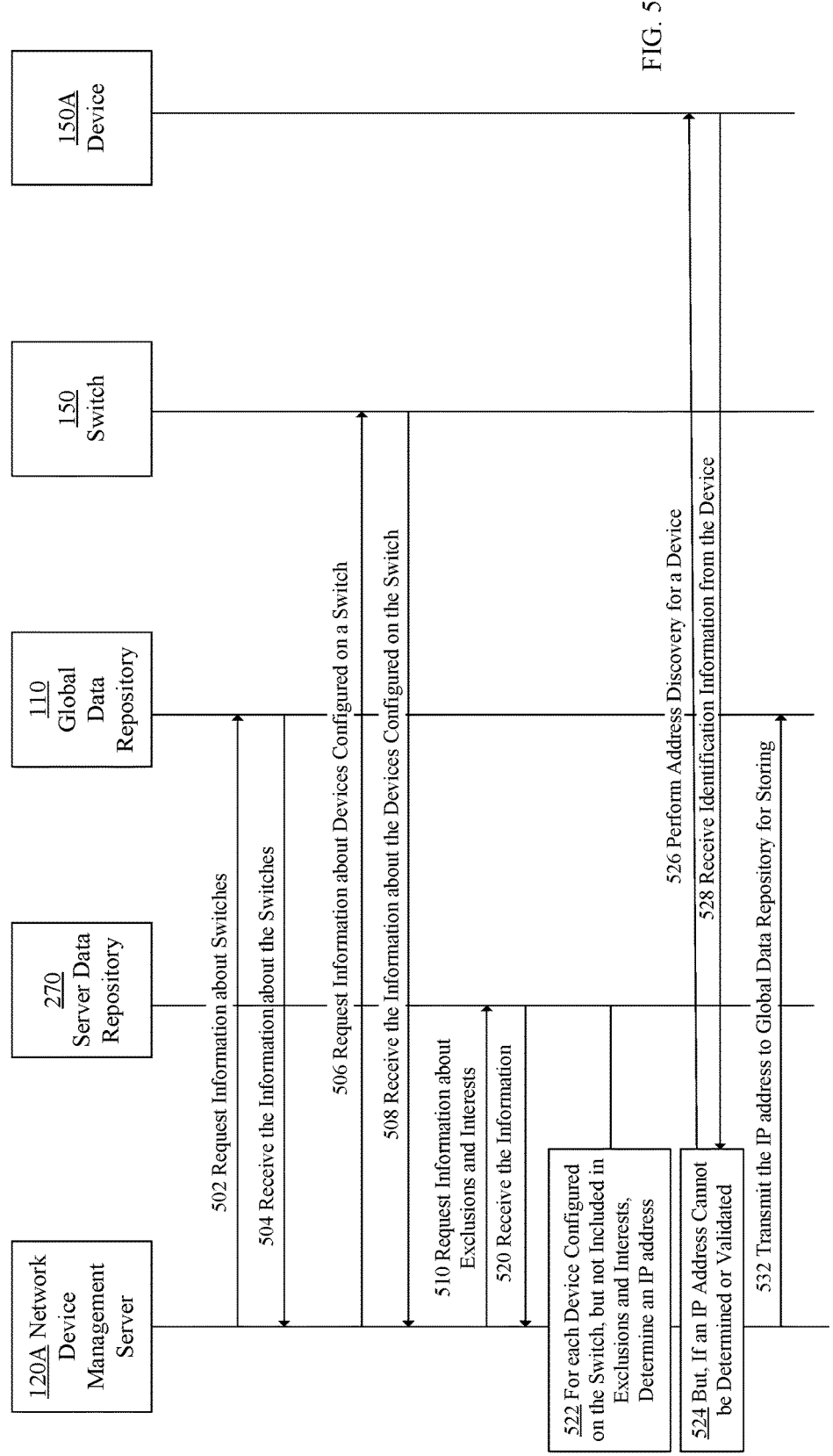
FIG. 5 depicts an example time chart for communications exchanged between an example network device management server, an example server data repository, an example global data repository, an example switch, and an example output device.

FIG. 5 depicts an example time chart for communications exchanged between an example network device management server 120A, an example server data repository 270, an example global data repository 110, a switch 150, and an example output device 150A.

To initiate an output devices discovery using network switches, network device management server 120A generates and transmits a request 502 to provide information about switches that are configured in a subnet managed by network device server 120A. The request may be processed by network device management server 120A itself if the server stores that information in for example, server data repository 270.

Alternatively, and as depicted in FIG. 5, request 502 may be transmitted from network device management server 120A to global data repository 110, and global data repository 110 may respond with the information about the respective switches.

Upon receiving 504 the information about the switches, server 120A generates and transmits requests 506 to switches for the switches to provide information about output devices that are configured on the switches. The requests may be broadcasted to a communications subnet that server 120A manages, or may be transmitted to the switches individually.

In the example depicted in FIG. 5, switch 150 receives request 506, and responds to the request by providing information about the output devices that are configured on switch 150. For example, switch 150 may provide information 1150 described in FIG. 3B.

Once server 120A receives a response 508 from switch 150, server 120A requests 510, or retrieves, information about exclusions and interests.

Information about exclusions may be provided as a list or a collection of MAC addresses of the devices for which server 120A is not expected to determine for example, IP addresses.

Information about interests may be provided as a filter that includes identifications of devices that are to be eliminated from the discovery performed by server 120A. The information about interests may be expressed in a form of OUIs. An OUI is a part of a MAC address, and provides encoded identification of devices that are owned by an organization, a company, or other entity. If the information about interests includes a particular OUI, then the devices that have the particular OUI in their respective MAC addresses will be eliminated from the output device discovery. In an alternative approach, if the information about interests includes a particular OUI, then the devices that have the particular OUI in their respective MAC addresses will be included in, not eliminated from, the discovery. The OUI are described in detail in 8C.

Information about interests may be provided as a list of OUIs, or as a table that includes the OUIs.

Upon receiving 520 the information about exclusion and the information about interests, network device management server 120A identifies 522 those devices, from the devices that are configured on switch 150, that are not included in the information about exclusions, and that are not included in the information about interests. For the identified devices, server 120A tries to determine an IP address based on information stored in server data repository 270.

However, if an IP address of an identified device cannot be determined or validated 524, based on information stored in server data repository 270, then network device management server 120A performs 526 address discovery of the device for the device to provide identification information about the device. Address discovery is a "backup" solution for determining the IP address of the device. The situations in which server 120A invokes address discovery are rather rare, and therefore, the time delays experienced in such situations are usually insignificant.

In the example depicted in FIG. 5, network device management server 120A performs 526 address discovery to receive identification information from device 150A.

Upon receiving 528 identification information from device 150A, network device management server 120A parses the identification information. The identification information may include a management information base (MIB), which in turn may include a description of the device, a MAC address of the devices, an IP address of the device, and other information specific to the configuration of the device.

Based on the identification information, network device management server 120A determines whether device 150A is an output device. This process is described in detail in FIG. 7. If device 150A is an output device, then server 120A transmits an IP address extracted from the MIB provided by device 150A to global data repository 110. Once the IP address of device 150A is stored in global data repository 110, a central manager may use the IP address to manage device 150A.

Optionally, or in addition to storing the IP address in global data repository 110, network device management server 120A may store the IP address in server data repository 270. Server 120A may mark the IP address as a validated address for future references.

Figure 6:
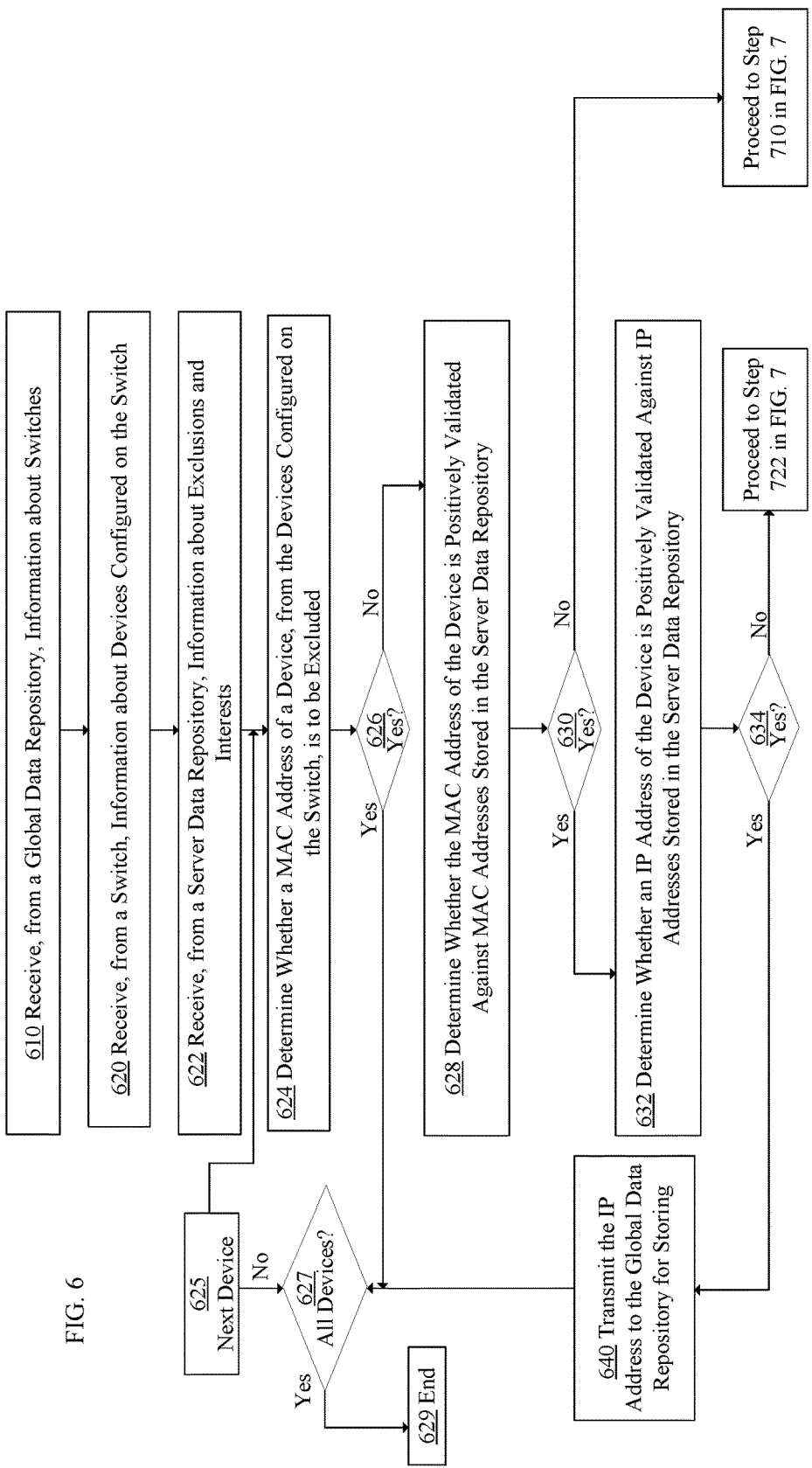
FIG. 6 depicts an example flow chart for performing output device discovery using network switches.

IX. Example Flow Chart for Performing Output Device Discovery Using Network Switches FIG. 6 depicts an example flow chart for performing output device discovery using network switches. In step 610, a network device management server receives, from a global data repository, information about switches. This step corresponds to action 504 in FIG. 5.

In step 620, the server receives, from a switch, information about devices that are configured on the switch. This step corresponds to action 508 in FIG. 5.

In step 622, the server receives, from a server data repository, information about exclusions and interests. This step corresponds to action 520 in FIG. 5.

In step 624, the server determines whether a MAC address of a device, from the devices that are configured on the switch, is to be excluded. This may be performed by comparing the MAC address of the device with MAC addresses included in the exclusion information. Also in this step, the server determines whether an OUI included in the MAC address of the device is included in the interest information.

If, in step 626, the server determines that the MAC address is listed in the exclusions, and in some situations that the MAC address is not listed in the interests, then step 627 is performed. Otherwise, step 628 is performed.

In step 627, the server tests whether there is another device that is configured on the switch, but that has not been subjected to the processing in step 624. If in step 625, it is determined that there is such a device, then the server performs step 624 for that device.

However, if there is no such a device, then the server proceeds to step 629, in which either the processing stops, or the server processes information received from another switch.

In step 628, the server determines whether the MAC address of the device can be positively validated against MAC addresses stored in a server data repository. Validation of the MAC address against the MAC addresses store in the server data repository may include testing whether the MAC address is included in information 400 of devices in server data repository 270 described in FIG. 4. If the MAC address of the device is included in information 400, then the server may positively validate the MAC address of the device because information 400 stores most likely the up-to-date inventory of the devices that the server manages in its subnetwork.

Figure 7:
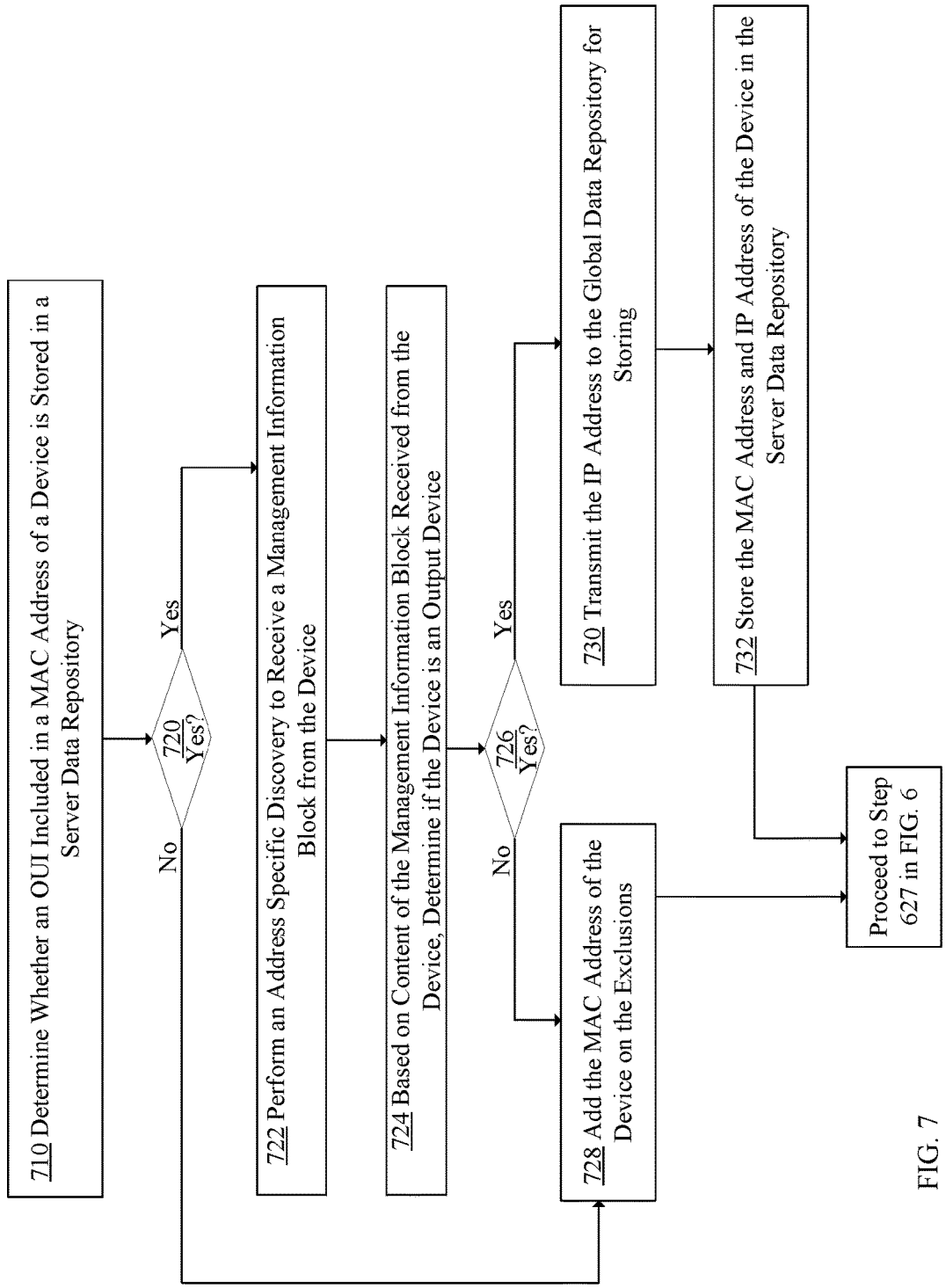
FIG. 7 depicts an example flow chart for determining whether to perform an address discovery of an output device.

If in step 630, the server positively validates the MAC address of the device, then step 632 is performed. Otherwise, step 710 described in FIG. 7 is performed.

In step 632, the server determines whether the server data repository stores an association between the MAC address and an IP address for the device. As described in FIG. 4, server data repository 270 may include information 400 about the devices that the server manages in its subnetwork, and that information 400 may include data records for those devices. However, some of the records, such as records 450B-450D may include MAC addresses, but not IP addresses. Hence, the server uses the server data repository to determine whether an IP address corresponding to the MAC address of the device has been already stored in information 400.

If in step 634, the server determines that the IP address is stored in the server data repository, and thus positively validates the IP address, then step 640 is performed. Otherwise, the server proceeds to step 722 described in FIG. 7.

In step 640, the server transmits the IP address of the device to the global data repository. At this point, the IP address of the device is added to a global data repository without executing address discovery to determine the device's IP address. The IP address was determined based on the information provided by the switches and based on the information stored in the server data repository, and without executing address discovery.

X. Example Flow Chart for Performing Address Discovery

FIG. 7 depicts an example flow chart for determining whether to perform address discovery of an output device. The process starts in step 710. Step 710 is performed when it is determined that a MAC address of a device that is configured on a switch has been positively validated by a network device management server, but a network device management server was unable to positively validate an IP address of the device. This may happen when for example, the network device management server determined that information 400 in server data repository 270 included a data record for the MAC address of the device, but that record did not include an IP address for the device. Examples of such data records include data records 450B-450D, and 470B-470C described in FIG. 4.

In step 710, the network device management server parses the MAC address of the device to determine an OUI included in the MAC address. Examples of MAC addresses and OUIs are described in FIG. 8A-8C.

Also in this step, the network device management server determines whether the OUI included in the MAC address is stored in a server data repository. This may include comparing the OUI extracted from the MAC address with OUIs 490 stored in server data repository 270 in FIG. 4.

If, in step 720, the server determines that the OUI extracted from the MAC address matches an OUI stored in OUI 490 in server data repository 270, then step 722 is performed. Otherwise, step 728 is performed.

In step 722, the server initiates an address-based discovery of the device that has the MAC address and requests an MIB from the device.

In step 724, the server receives the MIB from the devices, and based on contents of the MIB received from the device, the server determines whether the device is an output device. This may include analyzing the MIB to determine a parameter indicating whether the device is configured as an output device.

If in step 726, the server determined that the device is an output device, then step 730 is performed. Otherwise, step 728 is performed.

In step 730, the server transmits the IP address to a global data repository for storing.

In step 732, the server stores the IP address, and if needed the MAC address, of the device in a server data repository, and then proceeds to performing step 627 described in FIG. 6.

However, if based on analyzing the MIB received from the device, the network device management server determined that the device is not an output device, then in step 728, the server adds the MAC address of the device to the exclusion. The MAC address is added to the exclusions at this point because, even though in response to address discovery, the device responded and provided its own MIB, the content of the MIB indicates that the device is not an output device. Therefore, the server adds the corresponding MAC address to the exclusions. The information about the device will not be added to the global data repository because it is assumed that a central manager uses the global data repository to manage output devices.

XI. Examples of MAC Addresses

A MAC address of a device is a unique identifier assigned to the device's network interface to facilitate communications with the device at the data link layer. MAC addresses are used in most of the IEEE 802-based network technologies, including Ethernet and Wi-Fi. MAC addresses are used in the media access control protocol sublayer of the Open System Interconnect (OSI) reference model.

MAC addresses are most often assigned by manufacturers of network interface controllers (NICs) of devices, and are stored in the devices' read-only memory or some other firmware. If assigned by a manufacturer, a MAC address usually encodes the manufacturer's registered identification number, and may be referred to as a burned-in address (BIA). It may also be known as an Ethernet hardware address (EHA).

MAC addresses are formed according to the rules of one of three numbering name spaces managed by the Institute of Electrical and Electronics Engineers (IEEE): MAC-48, EUI-48, and EUI-64.

An original IEEE 802 MAC address is based on the original Xerox Ethernet addressing scheme. Its 48-bit address space contains potentially $2^{48}$ or 281,474,976,710, 656 possible MAC addresses. A EUI-64 MAC address may have even larger address space.

Figure 8A:
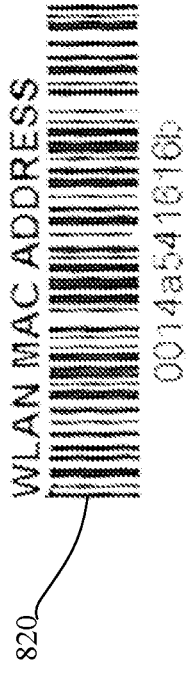
FIG. 8A depicts an example local area network MAC address.
Figure 8B:
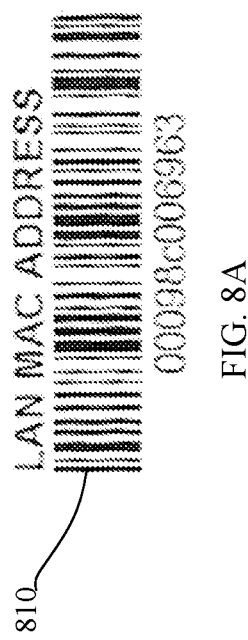
FIG. 8B depicts an example wireless local area network MAC address.

FIG. 8A depicts an example local area network MAC address 810, while FIG. 8B depicts an example wireless local area network MAC address 820. The depicted addresses are encoded both graphically and using hexadecimal numbers. The graphical representation is usually provided to facilitate an automatic scanning of the address using for example, optical scanners. The examples in FIG. 8A-8B are provided to merely illustrate simple examples, and should not be viewed as limited in any way.

XII. Organizationally Unique Identifiers

An organizationally unique identifier (OUI) is a 24-bit long number that is embedded in a MAC address of a device. An OUI uniquely identifies a vendor, or a manufacturer of the device, or an organization that owns the device. Typically, three octets of a MAC address of a device are used to encode an OUI. Hence, if the MAC address has 6 octets, then the first three octets of the MAC address may be used to encode the corresponding OUI.

Figure 8C:
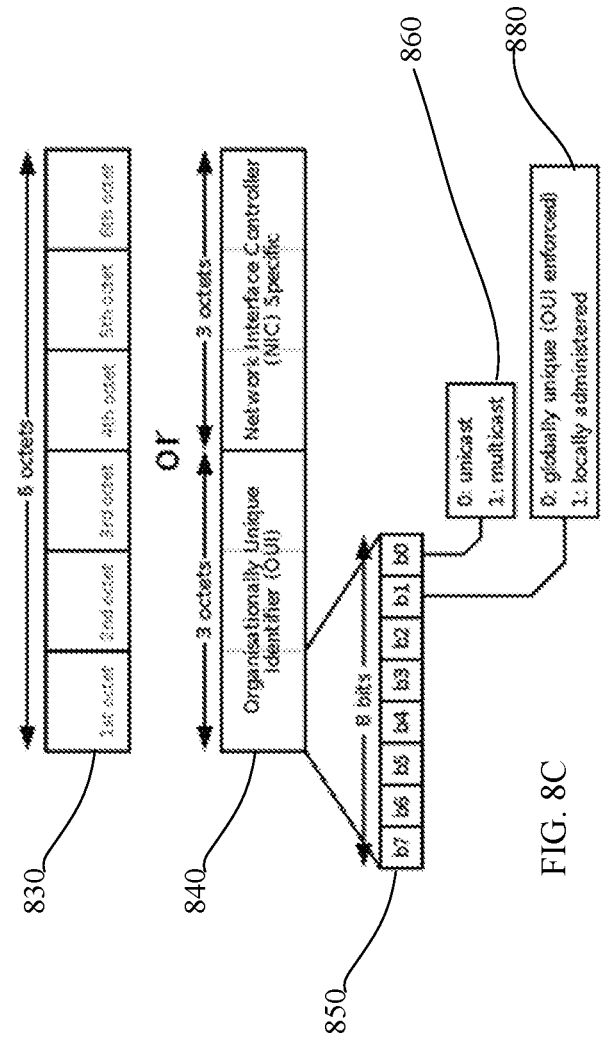
FIG. 8C depicts an example organizationally unique identifier embedded in a MAC address.

FIG. 8C depicts an example OUI embedded in a MAC address. Suppose that a MAC address 830 comprises 6 octets. Then, the first three octets 840 are used to encode an OUI. The OUI is 24-bit long.

Typically, 8 first bits of the OUI are used to store various flags. Examples of the flags are flags 860 and 880. Flag 860 indicates whether the corresponding device communicates via unicast-type transmissions or multicast-type transmissions. Flag 880 indicates whether the OUI is globally unique and thus globally enforced, or whether the OUI is locally administered.

XIII. Management Information Base

A management information base (MIB) is a formal description of a set of network objects that can be managed using the Simple Network Management Protocol (SNMP). An MIB is an ASCII text file that describes the SNMP network elements by providing a list of data objects that may be used to define attributes and attribute values of a network device.

An MIB may be used to provide information about a device. It allows translating numerical strings used to define objects into human-readable descriptions of the objects. Each MIB is addressed or identified using an object identifier (OID), and the OIDs may correspond to the device's settings or status.

In the context of a process for an improved approach for determining network addresses of output devices using network switches, a network device management server may request an MIB file from a device. The request for the MIB file may be sent as an SNMP message, and the SNMP message may use a MAC address of the device as the message's destination address. Upon receiving the MIB file from the device, the network device management server may parse the file to identify settings and status of the device. For example, the server may parse the MIB file and identify an IP address of the device, a name of the device, and so forth.

XIV. Improvements Provided by Certain Embodiments

In an embodiment, an approach for improving the process for determining network addresses of output devices using network switches is presented. The approach provides the ability to discover any types of subnets, including IPv4 and IPv6 subnets.

The approach allows querying network switches for providing information about the devices implemented in a network rather, than performing address and device discovery.

In an embodiment, the approach allows reducing server loading because the approach is performed without a need to query and process results requested and received from devices implemented in the network's subnet.

In an embodiment, the approach improves the process for determining network addresses of output device by placing minimal demands on network bandwidth. In comparison to typical address discoveries, the presented approach causes reducing network traffic because only newly discovered devices are individually queried.

In an embodiment, the approach causes reducing a discovery time because only a relatively small number of SNMP discovery queries are usually performed.

XV. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
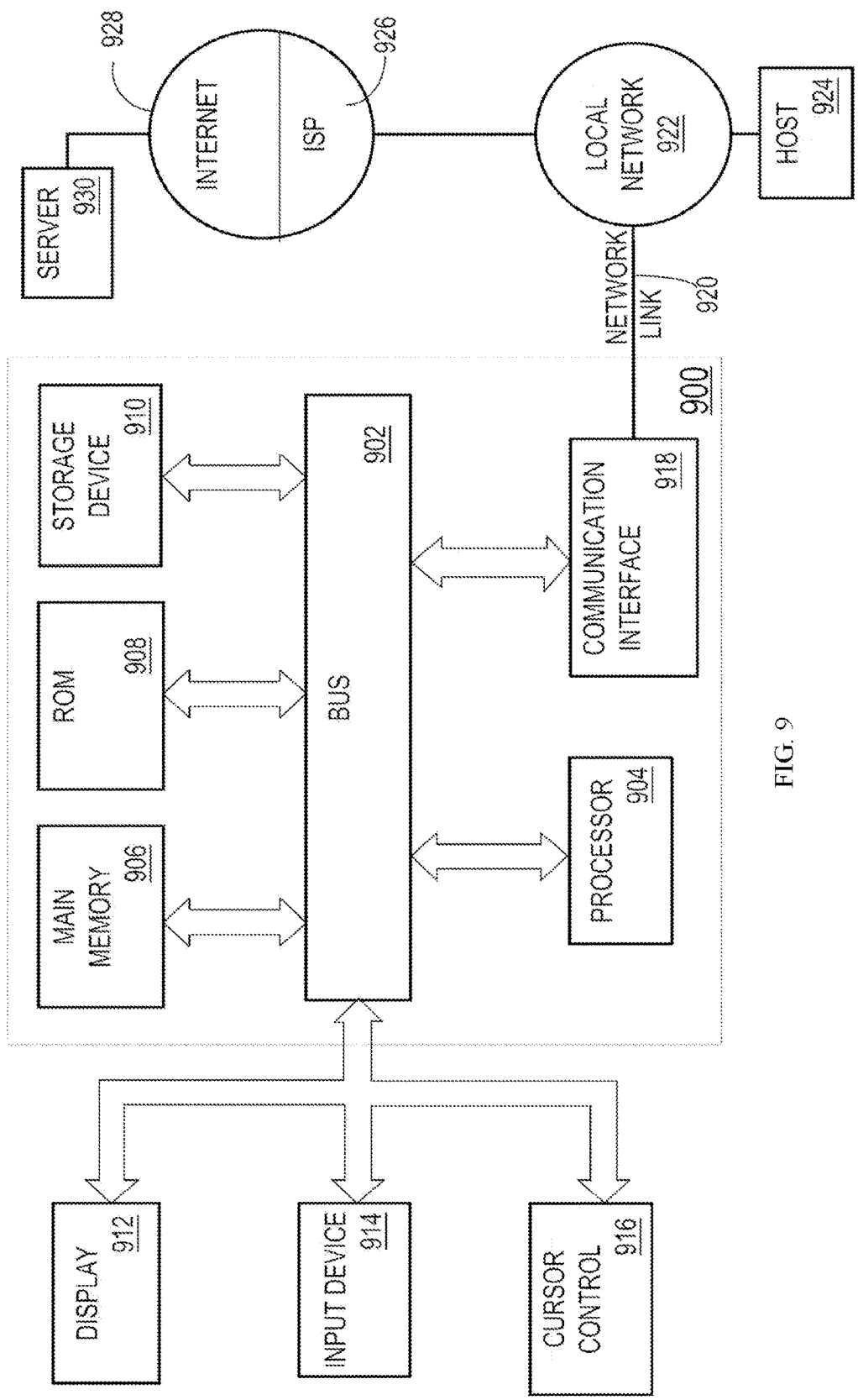
FIG. 9 is a block diagram that depicts an example computer system upon which embodiments may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the approach. Thus, embodiments are not limited to any specific combination of hardware circuitry and software.

The term "computer-readable medium" as used herein refers to any medium that participates in providing data that causes a computer to operation in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated service digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network device managing system for improving a process of determining network addresses of network devices, the network device managing system comprising:
a network device management server comprising a memory storing computer instructions which, when executed by one or more processors, cause the one or more processors to perform:
determining one or more network switches that communicate with the network device management server;
receiving one or more network addresses of one or more network devices that are to be excluded from a network address search;
for each network switch, from the one or more network switches:
receiving, from a network switch, one or more first addresses of one or more devices that are configured on the network switch;
for each device, from the one or more devices that are configured on the network switch:
determining whether a first address provided for the device matches any of the one or more devices that are to be excluded from the network address search;

in response to determining that the first address of the device does not match any of the one or more devices that are to be excluded from the network address search:
  determining whether an association between the first address and a second address is stored in a server data repository; and
  in response to determining that an association between the first address and a second address is stored in the server data repository, transmitting the second address to a global data repository.

2. The network device managing system of claim 1, wherein the first address is a media access control (MAC) address;
  wherein the second address is an Internet Protocol (IP) address;
  wherein the global data repository stores IP addresses of output devices that are to be managed globally; and
  wherein the server data repository is managed by the network device management server.

3. The network device managing system of claim 1, wherein the memory stores additional computer instructions which, when executed by the one or more processors, cause the one or more processors to perform:
  in response to determining that the association between the first address and the second address is not stored in the server data repository:
    performing an address-specific discovery of the device to receive information about the device;
    based on the information about the device, determining whether the device is an output device;
    in response to determining that the device is the output device:
      determining, based on the information about the device, a second address of the device; and
      transmitting the second address to the global data repository.

4. The network device managing system of claim 1, wherein the memory stores additional computer instructions which, when executed by the one or more processors, cause the one or more processors to perform:
  in response to determining that the first address of the device matches at least one address of the one or more devices that are to be excluded from the network address search, determining an address of another device from the one or more devices that are configured on the network switch.

5. The network device managing system of claim 1, wherein the memory stores additional computer instructions which, when executed by the one or more processors, cause the one or more processors to perform:
  in response to determining that no association between the first address and a second address is stored in the server data repository:
    parsing the first address to identify an organizationally unique identifier (OUI) in the first address;
    based on the OUI, determining whether the first address indicates a particular device that is to be excluded from the network address search; and
    in response to determining that the first address indicates a particular device that is to be excluded from the network address search: adding the first address to the one or more network addresses of one or more network devices that are to be excluded from a network address search.

6. The network device managing system of claim 3, wherein the memory stores additional computer instructions which, when executed by the one or more processors, cause the one or more processors to perform:
  performing the address-specific discovery of the device comprises:
    sending a request to a device having the first address to provide management block data of the device;
    in response to receiving the management block data from the device:
      parsing the management block data to determine whether the device is an output device;
      in response to determining that the device is an output device:
        parsing the management block data to determine a second address of the device; and
        transmitting the second address of the device to the global data repository.

7. The network device managing system of claim 3, wherein the memory stores additional computer instructions which, when executed by the one or more processors, cause the one or more processors to perform:
  in response to determining that the device is not an output device: adding the first address to the one or more network addresses of one or more network devices that are to be excluded from a network address search.

8. A method for improving a process of determining network addresses of network devices, the method comprising:
  determining one or more network switches that communicate with a network device management server;
  receiving one or more network addresses of one or more network devices that are to be excluded from a network address search;
  for each network switch, from the one or more network switches:
    receiving, from a network switch, one or more first addresses of one or more devices that are configured on the network switch;
    for each device, from the one or more devices that are configured on the network switch:
      determining whether a first address provided for the device matches any of the one or more devices that are to be excluded from the network address search;
      in response to determining that the first address of the device does not match any of the one or more devices that are to be excluded from the network address search:
        determining whether an association between the first address and a second address is stored in a server data repository; and
        in response to determining that an association between the first address and a second address is stored in the server data repository, transmitting the second address to a global data repository.

9. The method of claim 8, wherein the first address is a media access control (MAC) address;
  wherein the second address is an Internet Protocol (IP) address;
  wherein the global data repository stores IP addresses of output devices that are to be managed globally; and
  wherein the server data repository is managed by the network device management server.

10. The method of claim 8, further comprising:
in response to determining that the association between the first address and the second address is not stored in the server data repository:
  performing an address-specific discovery of the device to receive information about the device;
  based on the information about the device, determining whether the device is an output device;
  in response to determining that the device is the output device:
    determining, based on the information about the device, a second address of the device; and
    transmitting the second address to the global data repository.

11. The method of claim 8, further comprising:
in response to determining that the first address of the device matches at least one address of the one or more devices that are to be excluded from the network address search, determining an address of another device from the one or more devices that are configured on the network switch.

12. The method of claim 8, further comprising:
in response to determining that no association between the first address and a second address is stored in the server data repository:
  parsing the first address to identify an organizationally unique identifier (OUI) in the first address;
  based on the OUI, determining whether the first address indicates a particular device that is to be excluded from the network address search; and
  in response to determining that the first address indicates a particular device that is to be excluded from the network address search: adding the first address to the one or more network addresses of one or more network devices that are to be excluded from a network address search.

13. The method of claim 10, further comprising:
performing the address-specific discovery of the device comprises:
  sending a request to a device having the first address to provide management block data of the device;
  in response to receiving the management block data from the device:
    parsing the management block data to determine whether the device is an output device;
    in response to determining that the device is an output device:
      parsing the management block data to determine a second address of the device; and
      transmitting the second address of the device to the global data repository.

14. The method of claim 10, further comprising:
in response to determining that the device is not an output device: adding the first address to the one or more network addresses of one or more network devices that are to be excluded from a network address search.

15. One or more non-transitory computer-readable storage media storing one or more computer instructions which, when executed by one or more processors, cause the one or more processors to perform:
determining one or more network switches that communicate with a network device management server;
receiving one or more network addresses of one or more network devices that are to be excluded from a network address search;
for each network switch, from the one or more network switches:
  receiving, from a network switch, one or more first addresses of one or more devices that are configured on the network switch;
  for each device, from the one or more devices that are configured on the network switch:
    determining whether a first address provided for the device matches any of the one or more devices that are to be excluded from the network address search;
    in response to determining that the first address of the device does not match any of the one or more devices that are to be excluded from the network address search:
      determining whether an association between the first address and a second address is stored in a server data repository; and
      in response to determining that an association between the first address and a second address is stored in the server data repository, transmitting the second address to a global data repository.

16. The one or more non-transitory computer-readable storage media of claim 15,
wherein the first address is a media access control (MAC) address;
wherein the second address is an Internet Protocol (IP) address;
wherein the global data repository stores IP addresses of output devices that are to be managed globally; and
wherein the server data repository is managed by the network device management server.

17. The one or more non-transitory computer-readable storage media of claim 15, storing additional computer instructions which, when executed by the one or more processors, cause the one or more processors to perform:
in response to determining that the association between the first address and the second address is not stored in the server data repository:
  performing an address-specific discovery of the device to receive information about the device;
  based on the information about the device, determining whether the device is an output device;
  in response to determining that the device is the output device:
    determining, based on the information about the device, a second address of the device; and
    transmitting the second address to the global data repository.

18. The one or more non-transitory computer-readable storage media of claim 15, storing additional computer instructions which, when executed by the one or more processors, cause the one or more processors to perform:
in response to determining that the first address of the device matches at least one address of the one or more devices that are to be excluded from the network address search, determining an address of another device from the one or more devices that are configured on the network switch.

19. The one or more non-transitory computer-readable storage media of claim 15, storing additional computer instructions which, when executed by the one or more processors, cause the one or more processors to perform:
in response to determining that no association between the first address and a second address is stored in the server data repository:
  parsing the first address to identify an organizationally unique identifier (OUI) in the first address;

based on the OUI, determining whether the first address indicates a particular device that is to be excluded from the network address search; and in response to determining that the first address indicates a particular device that is to be excluded from the network address search: adding the first address to the one or more network addresses of one or more network devices that are to be excluded from a network address search.

20. The one or more non-transitory computer-readable storage media of claim 17, storing additional computer instructions which, when executed by the one or more processors, cause the one or more processors to perform:

performing the address-specific discovery of the device comprises:

sending a request to a device having the first address to provide management block data of the device;

in response to receiving the management block data from the device:

parsing the management block data to determine whether the device is an output device;

in response to determining that the device is an output device:

parsing the management block data to determine a second address of the device; and transmitting the second address of the device to the global data repository.

* * * * *